US00RE50000E

(19) United States
(12) Reissued Patent
Chen et al.

(10) Patent Number: US RE50,000 E
(45) Date of Reissued Patent: Jun. 4, 2024

(54) KEYSWITCH STRUCTURE

(71) Applicant: Darfon Electronics Corp., Taoyuan (TW)

(72) Inventors: Chih-Hao Chen, Taoyuan (TW); Chih-Hung Chen, Taoyuan (TW); Chin-Hung Lin, Taoyuan (TW); Ling-Hsi Chao, Taoyuan (TW); Chih-Chung Yen, Taoyuan (TW)

(73) Assignee: DARFON ELECTRONICS CORP., Taoyuan (TW)

(21) Appl. No.: 17/184,503

(22) Filed: Feb. 24, 2021

Related U.S. Patent Documents

Reissue of:
(64) Patent No.: 10,283,289
Issued: May 7, 2019
Appl. No.: 15/725,295
Filed: Oct. 5, 2017

(30) Foreign Application Priority Data

Mar. 30, 2017 (TW) ..... 106110717 A

(51) Int. Cl.
*H01H 13/14* (2006.01)
*H01H 3/12* (2006.01)
*H01H 13/10* (2006.01)
*H01H 13/50* (2006.01)

(52) U.S. Cl.
CPC ..... *H01H 13/14* (2013.01); *H01H 3/125* (2013.01); *H01H 13/10* (2013.01); *H01H 13/50* (2013.01); *H01H 2221/03* (2013.01)

(58) Field of Classification Search
CPC ..... H01H 13/10; H01H 13/14; H01H 13/50; H01H 13/186; H01H 13/18; H01H 13/7065; H01H 2001/125; H01H 1/12
See application file for complete search history.

(56) References Cited

U.S. PATENT DOCUMENTS 5,829,579 A 11/1998 Tsai
6,060,676 A * 5/2000 Pan ..... H01H 3/125 200/341
6,160,233 A 12/2000 Hu
6,300,583 B1 10/2001 Hsu
(Continued)

FOREIGN PATENT DOCUMENTS

CN 201167047 Y 12/2008
CN 201540845 U 8/2010
(Continued)

*Primary Examiner* — Terrence R Till

(57) ABSTRACT

A keyswitch structure includes a base, a keycap, a first support, a second support, and a connection structure. The keycap moves up and down relative to the base through the first support and the second support. The connection structure is disposed on the base and includes a vertical-motion limiting part and a horizontal-motion limiting part. The first support includes a rod-shaped connection portion and is connected to the connection structure through the rod-shaped connection portion. The vertical-motion limiting part prevents the rod-shaped connection portion from vertically moving. The horizontal-motion limiting part limits the horizontal movement of the rod-shaped connection portion. The vertical-motion limiting part and the horizontal-motion limiting part are separated in the rotation axis of the rod-shaped connection portion.

27 Claims, 18 Drawing Sheets

(56) References Cited

U.S. PATENT DOCUMENTS

| | | | | |
|---|---|---|---|---|
| 6,340,803 | B1 | 1/2002 | Li | |
| 6,550,993 | B2 | 4/2003 | Lu | |
| 6,730,868 | B1 * | 5/2004 | Watanabe | H01H 3/125 200/344 |
| 2014/0174900 | A1 | 6/2014 | Hsu | H01H 3/122 200/344 |
| 2016/0118204 | A1 | 4/2016 | Chang | |
| 2018/0025863 | A1 | 1/2018 | Lee | |

FOREIGN PATENT DOCUMENTS

| | | | |
|---|---|---|---|
| CN | 104183402 | A | 12/2014 |
| CN | 205920914 | U | 2/2017 |
| JP | 2001028216 | A | 1/2001 |
| TW | M470302 | U | 1/2014 |
| TW | M528009 | U | 9/2016 |

* cited by examiner

KEYSWITCH STRUCTURE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The invention relates to a mechanical keyswitch structure, and especially relates to a mechanical keyswitch structure providing a keycap thereof up and down movement through a supporting linkage.

2. Description of the Prior Art

For conventional scissors keyswitch structures, they use two supports to provide supporting and up and down movement to a keycap. The supports are movably connected to a base through connection structures disposed on the base; therein, one end of the support can slide or rotate in the connection structure. Therefore, the connection structures limit the movement of the keycap kinetically connected to the supports, for example the highest position of the keycap, by limiting the movement of the ends of the supports. Furthermore, the fitting degree of the end of the support with the corresponding connection structure (or the reliability or stability of the end moving in the corresponding structure) will also affect the highest position of the keycap. When the supports are assembled onto the base, the ends of the supports are usually pressed into the connection structures, so that the connection structures tend to damage or deform the ends in structure easily. The damage or deformation are just located at the portion of the end which interacts with the corresponding connection structure, so the damage or deformation will affect the movement stability of the end in the corresponding connection structure, which slightly changes the highest position which the keycap can reach and also changes a press stroke of the keycap (equivalent to a distance between the highest position and the lowest position by which the keycap moves relative to the base in a pressing process). When the keyswitch structure is formed in a large size, the press stroke of the keycap is also large, so that the ratio of the change in the press stroke to the whole press stroke is relatively small, which even does not affect the tactile feeling of a user pressing the keycap. For most situations of this case, the above change in the press stroke may be negligible. However, when the keyswitch structure is formed in a smaller and smaller size (e.g. under a miniaturization design of keyboard), the press stroke of the keycap is also reduced, so that the ratio of the change in the press stroke to the whole press stroke will not be small, which leads to a significant effect on the tactile feeling of a user pressing the keycap.

SUMMARY OF THE INVENTION

An objective of the invention is to provide a keyswitch structure. A horizontal-motion limiting part and a vertical-motion limiting part of a connection structure disposed on a base for connecting with a support are staggered so as to avoid that damage or deformation probably induced during an engagement of the support with the connection structure may affect the movement stability of the support in the connection structure.

A keyswitch structure of an embodiment according to the invention includes a base, a keycap, a first support, a second support, and a connection structure. The base has a first abutting surface. The keycap is disposed above the base. The first support is connected to and between the base and the keycap. The first support includes a rod-shaped connection portion. The second support is connected to and between the base and the keycap. The keycap is supported by the first support and the second support and moves up and down relative to the base through the first support and the second support. The first connection structure is disposed on the base and includes a first vertical-motion limiting part and a first horizontal-motion limiting part. The first vertical-motion limiting part is connected to the base and has a first constraining surface. The first constraining surface extends substantially along a first direction. The first direction is substantially parallel to the first abutting surface. The first constraining surface and the first abutting surface are disposed opposite and define a first engaging space therebetween. The rod-shaped connection portion is movably disposed in the first engaging space. The rod-shaped connection portion is movable substantially parallel to the first direction or rotatable around a second direction. The second direction is perpendicular to the first direction and parallel to the first abutting surface. The first horizontal-motion limiting part is connected to the base and has a first limiting surface. The first limiting surface is substantially perpendicular to the first direction. The first limiting surface and the first constraining surface are separated in the second direction. The first limiting surface faces the rod-shaped connection portion. The first limiting surface limits movement of the rod-shaped connection portion in the first direction by blocking the rod-shaped connection portion in the first engaging space. Therein, a projection of the first limiting surface in the second direction is located within a projection of the first engaging space in the second direction. Therefore, after the keyswitch structure is assembled completely, when the keyswitch structure acts, the first vertical-motion limiting part constrains the rod-shaped connection portion to remain at a vertical position relative to the base, and the first horizontal-motion limiting part limits the horizontal movement range of the rod-shaped connection portion relative to the base. For more details, in the assembling of the rod-shaped connection portion to the first connection structure, a portion of the rod-shaped connection portion corresponding to the first horizontal-motion limiting part will not structurally interfere with the first horizontal-motion limiting part, so that the first horizontal-motion limiting part can perform the horizontally limiting effect to the rod-shaped connection portion as expected. Although another portion of the rod-shaped connection portion corresponding to the first vertical-motion limiting part may be damaged or deformed in the assembling of the rod-shaped connection portion to the first connection structure, the damage or deformation will not contact the first constraining surface of the first vertical-motion limiting part in principle, so that the vertically constraining effect of the first vertical-motion limiting part to the rod-shaped connection portion will not be affected. In other words, the first vertical-motion limiting part can perform the vertically constraining effect to the rod-shaped connection portion as expected.

A keyswitch structure of another embodiment according to the invention includes a base, a keycap, a first support, a second support, and a connection structure. The base includes a first abutting surface. The first abutting surface extends parallel to an X-axis direction. The keycap is disposed above the base. The first support movably is connected to and between the base and the keycap. A lower end of the first support has a rod-shaped connection portion. The rod-shaped connection portion has a first portion side surface and a second portion side surface. The first portion side surface and the second portion side surface are separated by a distance in a Y-axis. The second support is movably connected to and between the base and the keycap. The keycap is supported by the first support and the second support and moves between a higher position and a lower position along a Z-axis direction through the first support and the second support. The X-axis direction, the Y-axis direction, and the Z-axis direction are non-parallel to each other. The first connection structure is disposed on the base and includes a vertical-motion limiting part and a first horizontal-motion limiting part. The vertical-motion limiting part is connected to the base and has a first constraining surface. The first constraining surface extends substantially along the X-axis direction. The first constraining surface and the first abutting surface are disposed opposite and define a first engaging space therebetween. The rod-shaped connection portion is movably disposed in the first engaging space. The first horizontal-motion limiting part is connected to the base and has a first limiting surface. The first limiting surface is substantially perpendicular to the X-axis direction. The first limiting surface faces the rod-shaped connection portion. The first limiting surface sets a movement end of the rod-shaped connection portion along the X-axis direction by blocking the rod-shaped connection portion. Therein, the first limiting surface and the first constraining surface are separated by the distance in the Y-axis direction. When the keycap moves away from the base to the higher position, the first constraining surface abuts the second portion side surface without contacting the first portion side surface. When the keycap moves relative to the base along the Z-axis direction to the higher position, the first limiting surface abuts the first portion side surface without contacting the second portion side surface. Similarly, after the keyswitch structure is assembled completely, when the keyswitch structure acts, the first vertical-motion limiting part can perform the vertically constraining effect to the rod-shaped connection portion as expected, and the first horizontal-motion limiting part can perform the horizontally limiting effect to the rod-shaped connection portion as expected.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
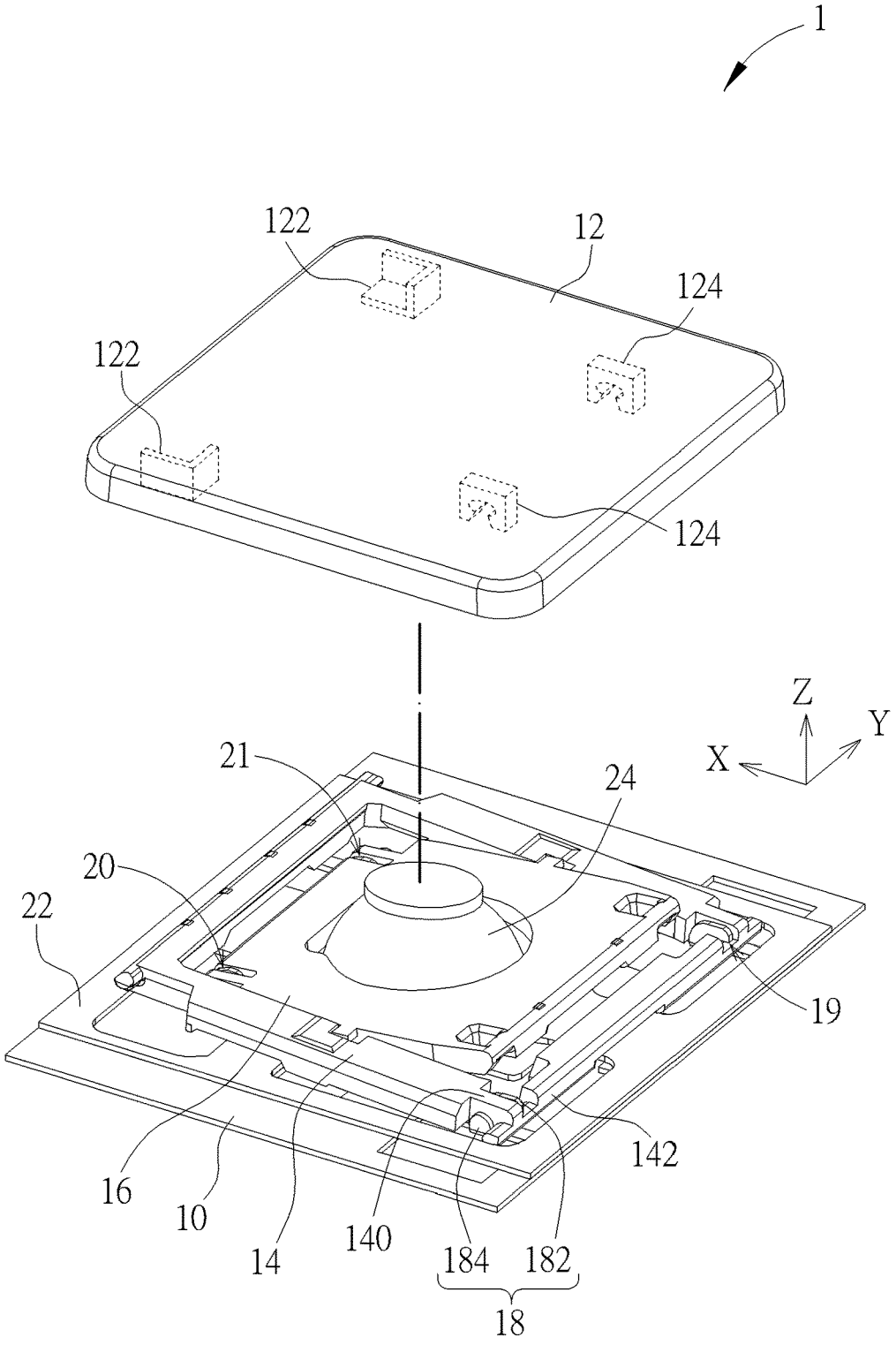
FIG. 1 is a schematic diagram illustrating a keyswitch structure of an embodiment according to the invention; therein, the keyswitch structure is partially exploded.
Figure 2:
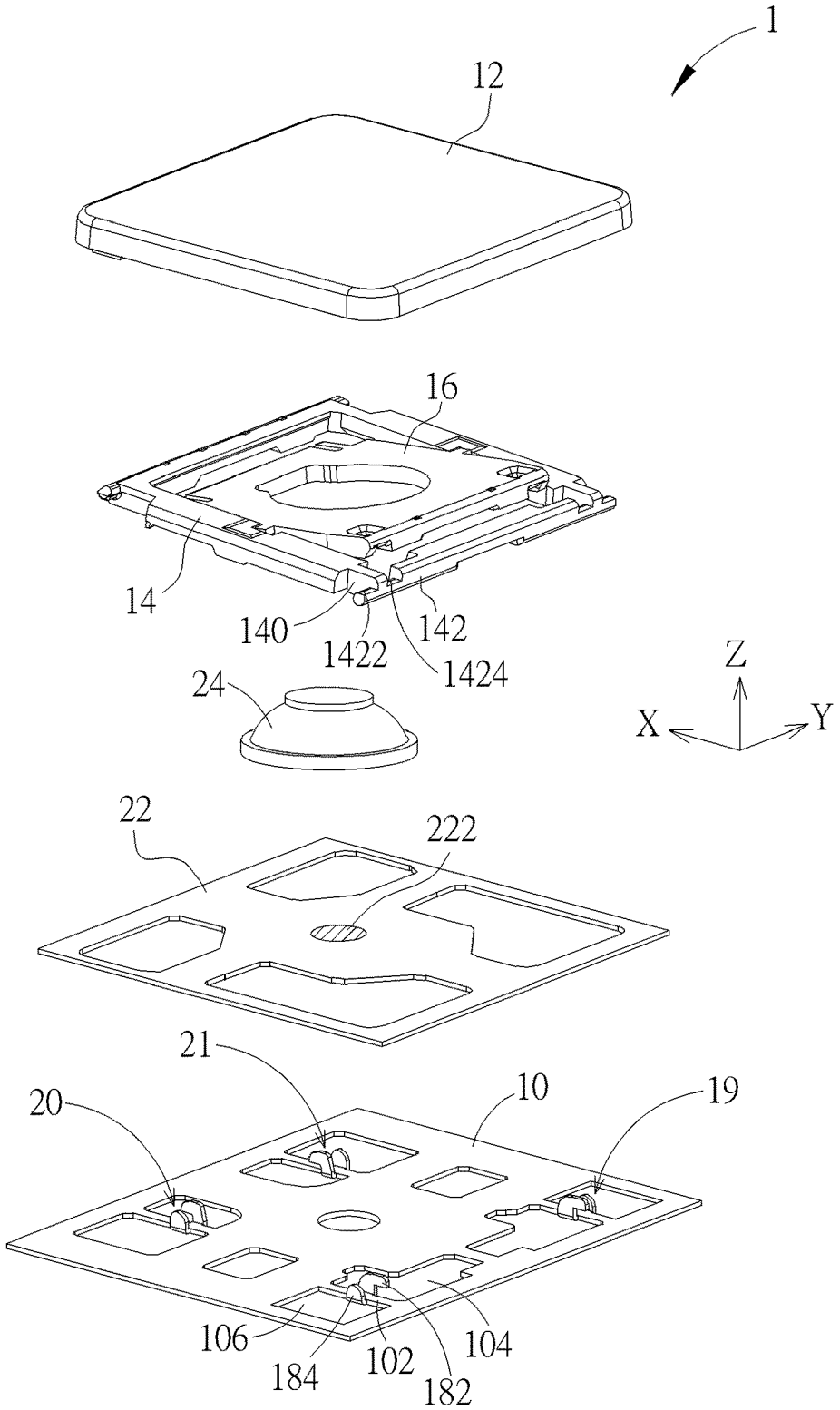
FIG. 2 is an exploded view of the keyswitch structure in FIG. 1.

Please refer to FIG. 1 and FIG. 2. A keyswitch structure 1 of an embodiment according to the invention includes a base 10, a keycap 12, a first support 14, a second support 16, a first connection structure 18, a second connection structure 19, a third connection structure 20, a fourth connection structure 21, a membrane circuit board 22, and an elastic dome 24. The keycap 12 is disposed above the base 10. The first support 14 and the second support 16 are pivotally connected to each other and are movably connected to and between the base 10 and the keycap 12. The first to the fourth connection structures 18-21 are disposed on the base 10. The membrane circuit board 22 is disposed on the base 10. The elastic dome 24 is disposed on the membrane circuit board 22. Therein, the keycap 12 is supported by the first support 14 and the second support 16 and moves up and down relative to the base 10 through the first support 14 and the second support 16 (or moves between a higher position and a lower position along a Z-axis direction). The first support 14 is connected to the base 10 through the first connection structure 18 and the second connection structure 19. The first support 14 is also connected to the keycap 12 through connection structures 122 (shown in hidden lines in FIG. 1) of the keycap 12. The second support 16 is connected to the base through the third connection structure 20 and the fourth connection structure 21. The second support 16 is also connected to the keycap 12 through connection structures 124 (shown in hidden lines in FIG. 1) of the keycap 12. When the keycap 12 is pressed, the keycap 12 moves toward the base 10 to compress the elastic dome 24 and then triggers a switch 222 (shown by a dashed circle in FIG. 2) of the membrane circuit board 22 through the elastic dome 24.

Figure 3:
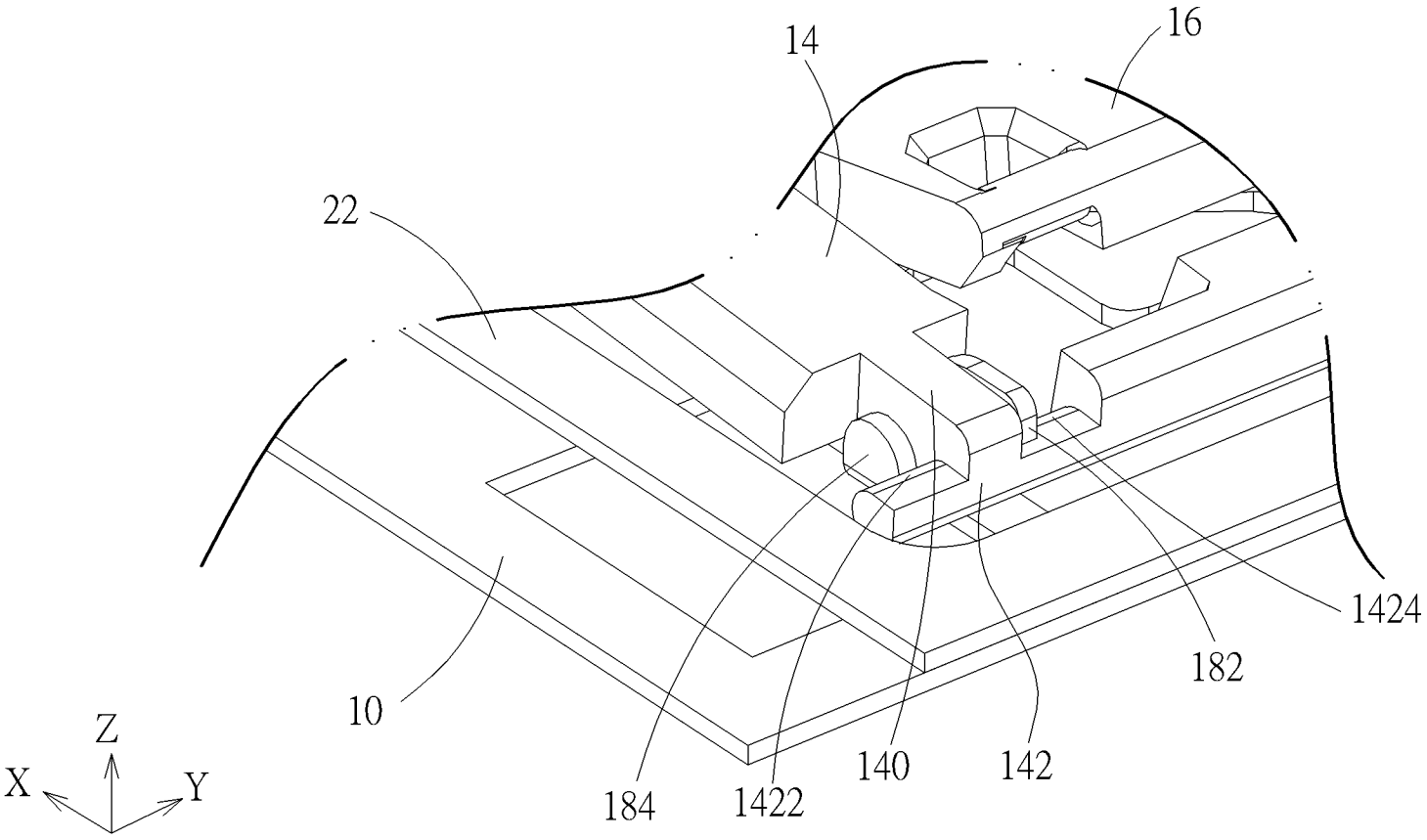
FIG. 3 is a schematic diagram illustrating an engagement of a first support with a first connection structure of the keyswitch structure in FIG. 1.
Figure 4:
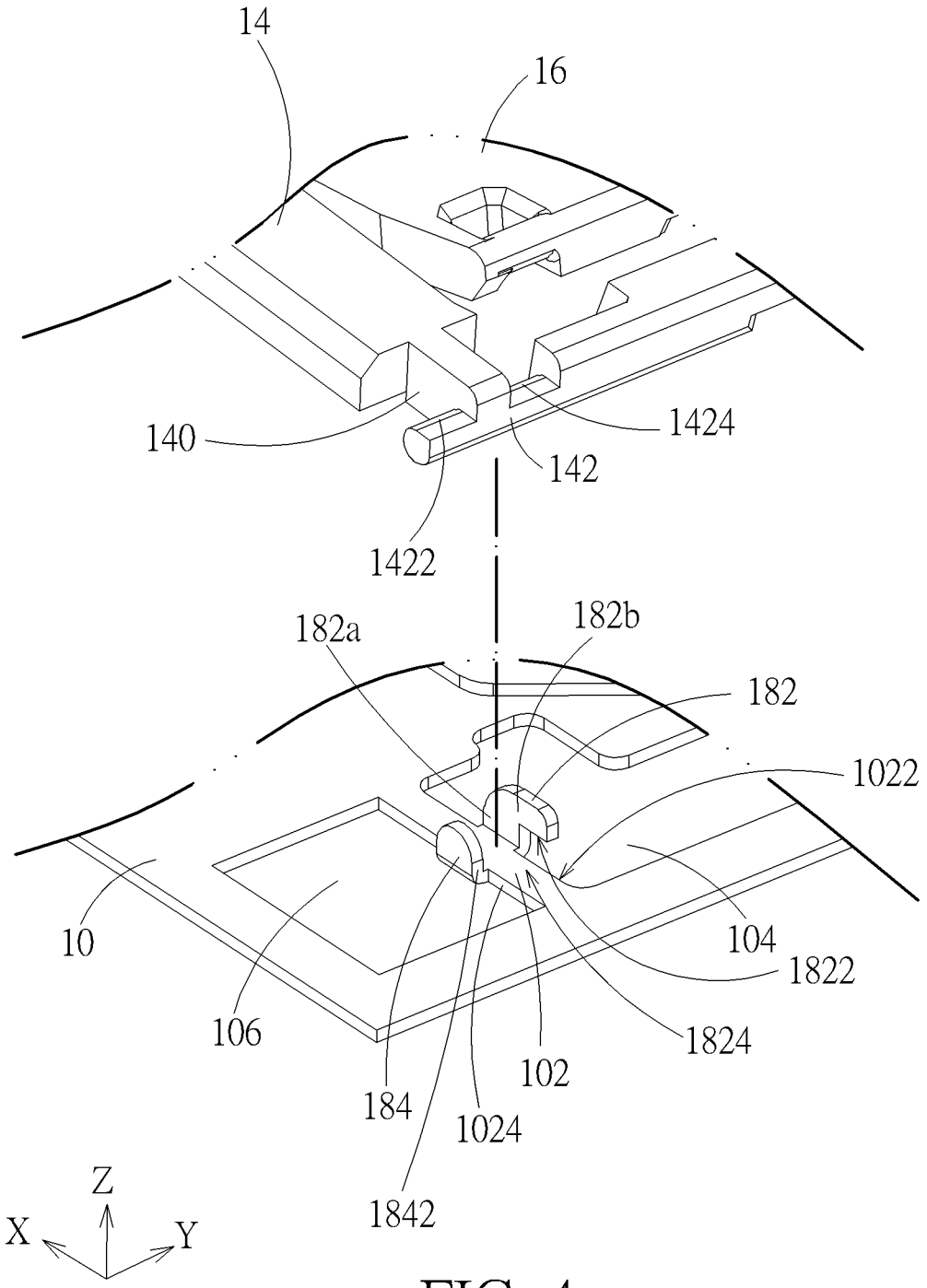
FIG. 4 is a schematic diagram illustrating disassembly of the first support and a first connection structure of the keyswitch structure in FIG. 3.

Please also refer to FIG. 3 and FIG. 4. In the embodiment, the base 10 has a first abutting surface 102. A lower end of the first support 14 has a rod-shaped connection portion 142. The first connection structure 18 includes a first vertical-motion limiting part 182 and a first horizontal-motion limiting part 184. The first vertical-motion limiting part 182 is connected to the base 10 and has a first constraining surface 1822. The first constraining surface 1822 extends substantially along a first direction (or an X-axis direction). The first direction is substantially parallel to the first abutting surface 102. The first constraining surface 1822 and the first abutting surface 102 are disposed opposite and extend in parallel to form a first engaging space 1824 therebetween. The rod-shaped connection portion 142 is movably disposed in the first engaging space 1824. The rod-shaped connection portion 142 is movable substantially parallel to the first direction or rotatable around a second direction (or a Y-axis direction). The second direction is perpendicular to the first direction and is parallel to the first abutting surface 102. In other words, the first vertical-motion limiting part 182 constrains the rod-shaped connection portion 142 to remain at a position in the Z-axis direction relative to the base 10, so that the rod-shaped connection portion 142 will not move along the Z-axis direction (or vertically). The X-axis direction, the Y-axis direction, and the Z-axis direction are not parallel to each other; in the embodiment, the three directions are substantially perpendicular to each other. The first horizontal-motion limiting part 184 is connected to the base 10 and has a first limiting surface 1842. The first limiting surface 1842 is substantially perpendicular to the first direction. The first limiting surface 1842 and the first constraining surface 1822 are separated in the second direction. The first limiting surface 1842 faces the rod-shaped connection portion 142. The first limiting surface 1842 limits movement of the rod-shaped connection portion 142 in the first direction by blocking rod-shaped connection portion 142 in the first engaging space 1824.

Furthermore, in the embodiment, the first vertical-motion limiting part 182 is provided in an L-shaped structure, the first horizontal-motion limiting part 184 is provided in a post; however, the invention is not limited thereto. Furthermore, in the embodiment, the base 10 is a metal base plate. The base 10 includes two through holes 104 and 106. The first abutting surface 102 is located between the two through holes 104 and 106 and is a top surface of a strip structure extending parallel to the first direction. The strip structure has a first side edge 1022 and a second side edge 1024. The first vertical-motion limiting part 182 is disposed at the first side edge 1022. The first horizontal-motion limiting part 184 is disposed at the second side edge 1024. In the embodiment, the base 10 is structurally integrated with the first vertical-motion limiting part 182 and the first horizontal-motion limiting part 184, which can be formed by stamping a metal plate in practice. Therein, the first vertical-motion limiting part 182 is formed by a portion of the metal base plate, which protrudes from the first side edge 1022 and bends and extends upward. The first horizontal-motion limiting part 184 is formed by a portion of the metal base plate, which protrudes from the second side edge 1024 and bends and extends upward. However, the invention is not limited thereto. For example, the first vertical-motion limiting part 182 and the first horizontal-motion limiting part 184 are additional parts fixed (e.g. by soldering or structurally engaging) onto the base 10 (e.g. a metal plate).

Figure 5:
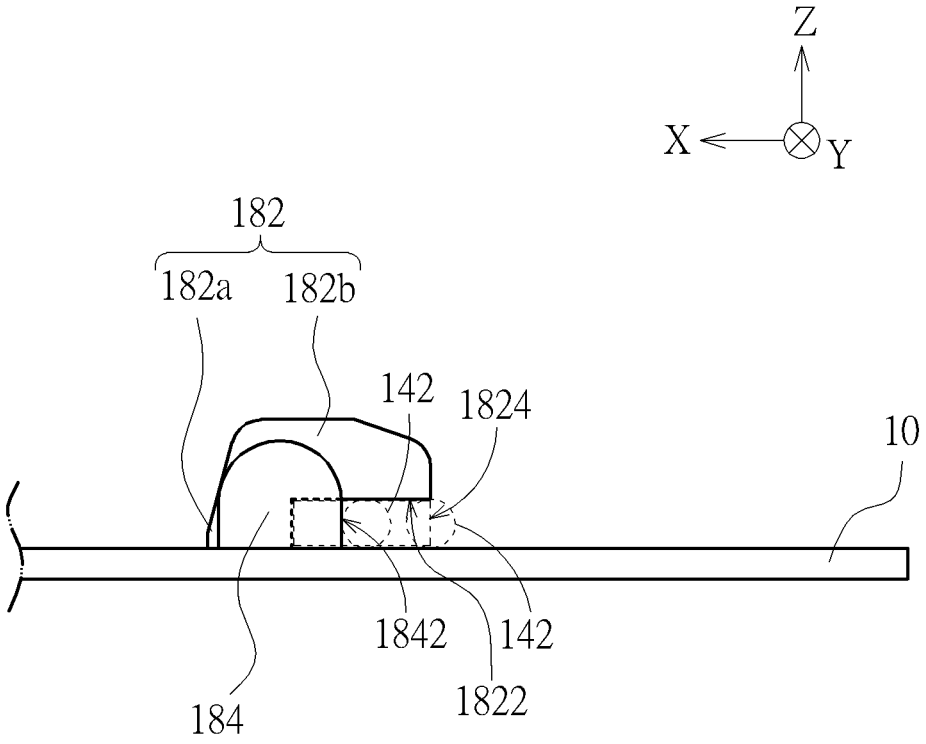
FIG. 5 is a side view of a portion of a base of the keyswitch structure in FIG. 3.

Please also refer to FIG. 5. In FIG. 5, portions of the first vertical-motion limiting part 182 hidden by the first horizontal-motion limiting part 184 are shown in hidden lines. In the embodiment, the first vertical-motion limiting part 182 includes a vertical connection portion 182a and a horizontal extension portion 182b which are connected to the base 10. The horizontal extension portion 182b extends in a direction reverse to the first direction (or the X-axis direction). A bottom surface of the horizontal extension portion 182b functions as the first constraining surface 1822. Therein, for simple description, the extension length of the horizontal extension portion 182b is exaggeratedly shown in FIG. 5. A projection of the first limiting surface 1842 in the second direction is located within a projection (equivalent to the dashed rectangle in FIG. 5) of the first engaging space 1824 in the second direction. Therefore, the rod-shaped connection portion 142 (shown by a dashed circle in FIG. 5) horizontally moves in the first engaging space 1824 (or moves in the first direction) without contacting the vertical connection portion 182a of the first vertical-motion limiting part 182. The rod-shaped connection portion 142 is limited to horizontally move (or slide) under the constraint of the first constraining surface 1822. The first limiting surface 1842 can stop the rod-shaped connection portion 142 from moving in the first direction; that is, the first limiting surface 1842 sets a movement end of the rod-shaped connection portion 142 along the X-axis direction by blocking the rod-shaped connection portion 142. In FIG. 5, when the rod-shaped connection portion 142 is located at the left dashed circle (i.e. blocked by the first limiting surface 1842), the first support 14 and the second support 16 support the keycap 12 to the higher position. When the rod-shaped connection portion 142 is located at the right dashed circle, the first support 14 and the second support 16 support the keycap 12 to the lower position; that is, the keycap 12 is pressed.

From another view, the rod-shaped connection portion 142 has a first portion side surface 1422 and a second portion side surface 1424. The first portion side surface 1422 and the second portion side surface 1424 are separated by a distance (substantially equal to the length of the strip structure, which provides the first abutting surface 102, in the Y-axis direction) in the Y-axis direction (or the second direction). When the keycap 12 moves relative to the base 10 along the Z-axis axis, the first constraining surface 1822 abuts the second portion side surface 1424 without contacting the first portion side surface 1422. When the keycap 12 moves relative to the base 10 along the Z-axis direction to the higher position, the first limiting surface 1842 abuts the first portion side surface 1422 without contacting the second portion side surface 1424. Furthermore, a structural end of the first vertical-motion limiting part 182 (i.e. a free end of the horizontal extension portion 182b) in a direction reverse to the first direction is protrusive relative to a structural end of the first horizontal-motion limiting part 184 in the direction reverse to the first direction; therein, in the embodiment, the first horizontal-motion limiting part 184 is a vertical post, so the first limiting surface 1842 is equivalent to the structural end of the first horizontal-motion limiting part 184. Therefore, during the assembling of the first support 14 to the first connection structure 18 (e.g. by directly pressing the rod-shaped connection portion 142 down into the engaging space 1824 to the position indicated by the right dashed circle in FIG. 5), only the second portion side surface 1424 of the rod-shaped connection portion 142 will contact or push against the free end of the horizontal extension portion 182b, so the first portion side surface 1422 of the rod-shaped connection portion 142 will not structurally interfere with the first connection structure 18. In the assembling of the rod-shaped connection portion 142 to the first connection structure 18, the rod-shaped connection portion 142 itself has a little capability of elastically deforming (e.g. when the first support 14 is a plastic injection part), but the second portion side surface 1424 still may be scraped by the free end of the horizontal extension portion 182b and then get a slight deformation or an indentation thereon. From a viewpoint as FIG. 5, the deformation or damage occurs at the left side of the second portion side surface 1424 in principle while the first constraining surface 1822 contacts the top side of the second portion side surface 1424, so the deformation or damage will not affect the exact vertical constraint of the first constraining surface 1822 to the rod-shaped connection portion 142. Furthermore, in the assembling of the rod-shaped connection portion 142 to the first connection structure 18, the first portion side surface 1422 does not structurally interfere with the free end of the horizontal extension portion 182b, so the first portion side surface 1422 can remain its whole structural profile so that the exact horizontal limitation of the first limiting surface 1842 to the rod-shaped connection portion 142 will not be affected by the assembling; that is, the movement end of the rod-shaped connection portion 142 in the X-axis direction can be exactly set. Therefore, by staggering the first vertical-motion limiting part 182 and the first horizontal-motion limiting part 184 in the second direction (or the Y-axis direction), even though a portion of the rod-shaped connection portion 142 structurally interferes with the first connection structure 18 leading to structural jostling, deformation, or scrape, the first connection structure 18 still can provide a reliable and stable movement limiting effect (including the vertical constraint and the horizontal limitation) to the rod-shaped connection portion 142. Besides, even when the keyswitch structure 1 is reduced in size, the first connection structure 18 still can provide the reliable and stable movement limiting effect to the rod-shaped connection portion 142. In addition, in the embodiment, the first horizontal-motion limiting part 184 and the first vertical-motion limiting part 182 are disposed in the second direction in order; however, the invention is not limited thereto. For example, the first horizontal-motion limiting part 184 and the first vertical-motion limiting part 182 are interchanged, which also can provide the reliable and stable movement limiting effect to the rod-shaped connection portion 142.

In addition, in the embodiment, the first support 14 includes a support plate 140 connected to the rod-shaped connection portion 142. The first vertical-motion limiting part 182 and the first horizontal-motion limiting part 184 are located at two sides of the support plate 140, so that the first connection structure 18 can position the first support 14 in the second direction (or the Y-axis direction). In the embodiment, the second to the fourth connection structures 19-21 are structurally the same as the first connection structure 18. The connections of the first support 14 and the second support 16 with the second to the fourth connection structures 19-21 are structurally similar to the connection of the first support 14 with the first connection structure 18. Therefore, for descriptions of the connections of the first support 14 and the second support 16 with the second to the fourth connection structures 19-21, please refer to the above description of the connection of the first support 14 with the first connection structure 18, which will not be described in addition.

Figure 6:
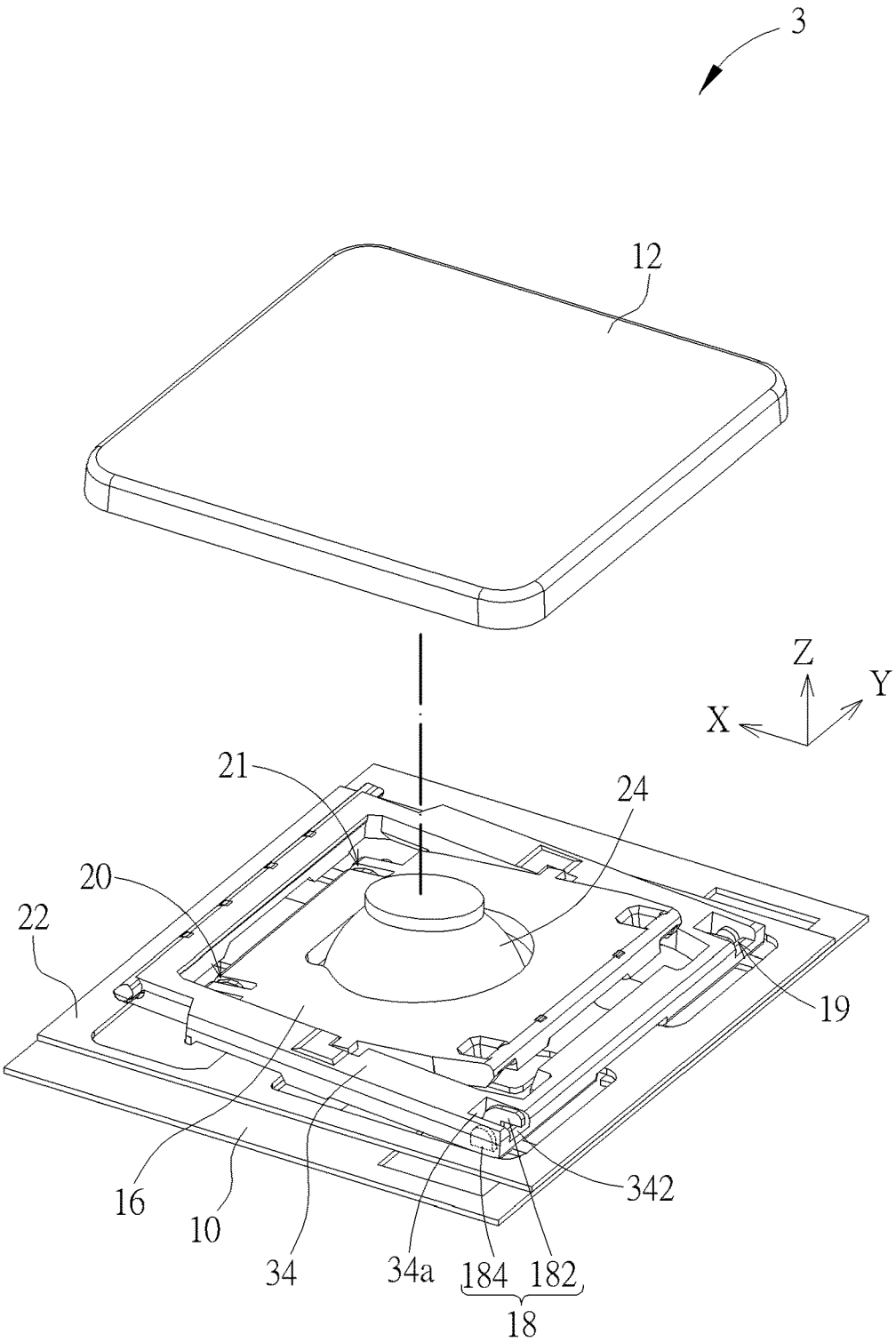
FIG. 6 is a schematic diagram illustrating a keyswitch structure of another embodiment; therein, the keyswitch structure is partially exploded.
Figure 7:
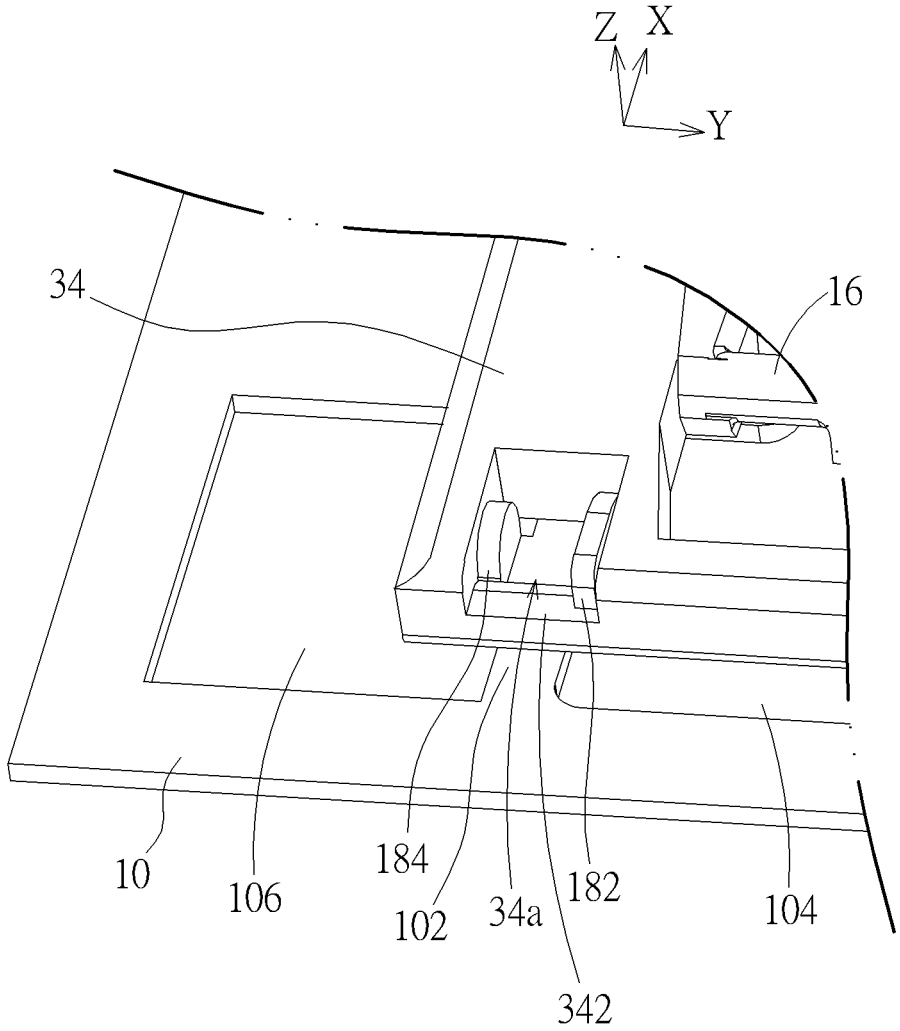
FIG. 7 is an enlarged view of a portion of the keyswitch structure in FIG. 6 with respect to a first connection structure thereof.

In the embodiment, the first vertical-motion limiting part 182 and the first horizontal-motion limiting part 184 are located at two sides of the support plate 140 of the first support 14. However, the invention is not limited thereto. Please refer to FIG. 6 and FIG. 7. FIG. 6 is a schematic diagram illustrating a keyswitch structure 3 of another embodiment according to the invention; therein, the keyswitch structure 3 is partially exploded. FIG. 7 is an enlarged view of a portion of the keyswitch structure 3 in FIG. 6 with respect to the first connection structure 18; therein, for simplification of the figure, the membrane circuit board 22 is not shown in FIG. 7. The keyswitch structure 3 is structurally similar to the keyswitch structure 1, and therefore, the keyswitch structure 3 uses reference numbers used in the keyswitch structure 1 in principle. For other descriptions of the components of the keyswitch structure 3, please refer to the relevant descriptions of the components of the keyswitch structure 1 with the same component names, which will not be described in addition. A significant difference between the keyswitch structure 3 and the keyswitch structure 1 is that a first support 34 of the keyswitch structure 3 has a through hole 34a adjacent to a rod-shaped connection portion 342 of the first support 34. The first connection structure 18 of the keyswitch structure 3 includes the first vertical-motion limiting part 182 and the first horizontal-motion limiting part 184 (shown in hidden lines in FIG. 6) which are located in the through hole 34a. Similarly, the first connection structure 18 also can position the first support 34 in the second direction through the through hole 34a.

Figure 8:
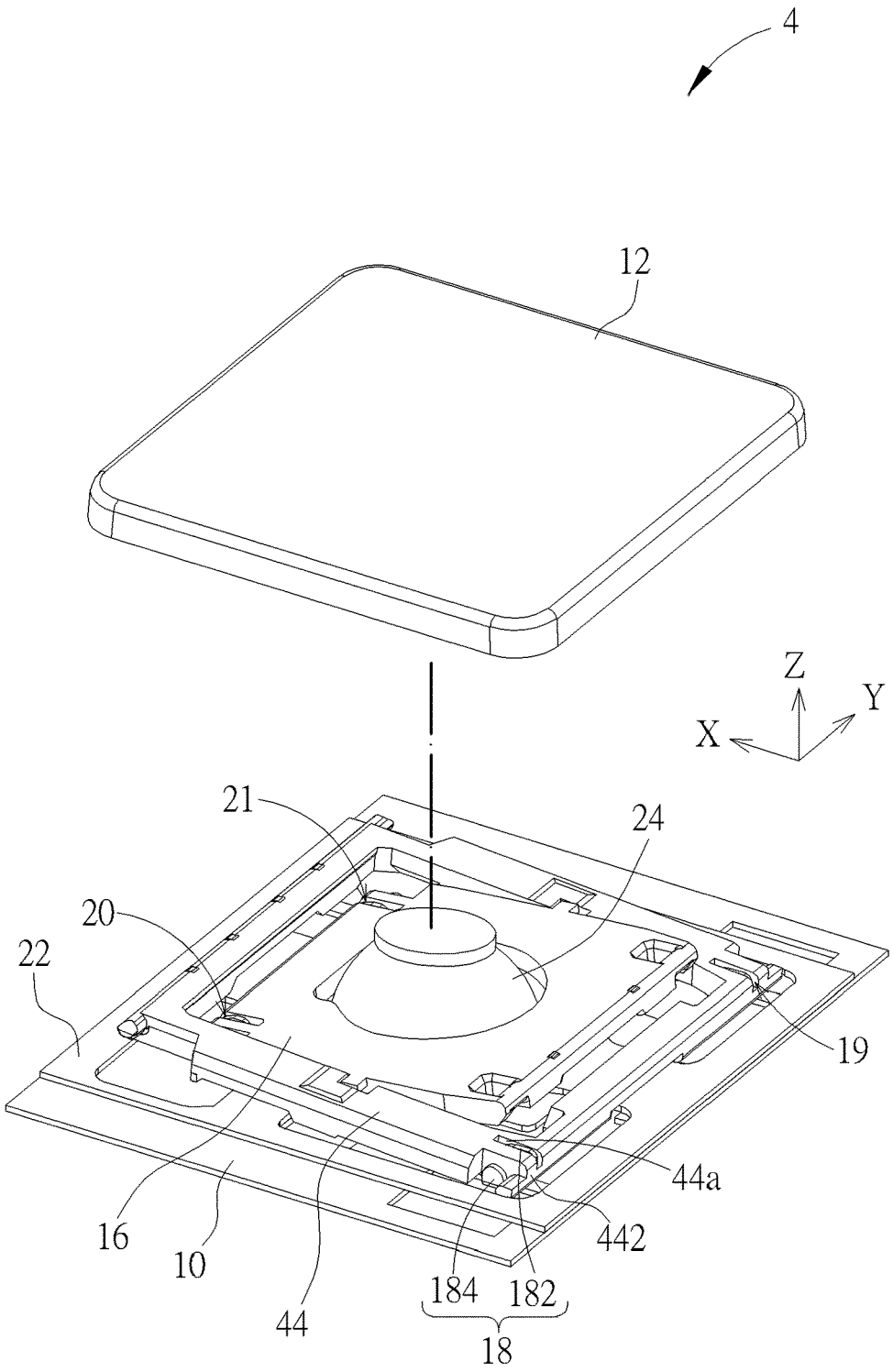
FIG. 8 is a schematic diagram illustrating a keyswitch structure of another embodiment; therein, the keyswitch structure is partially exploded.
Figure 9:
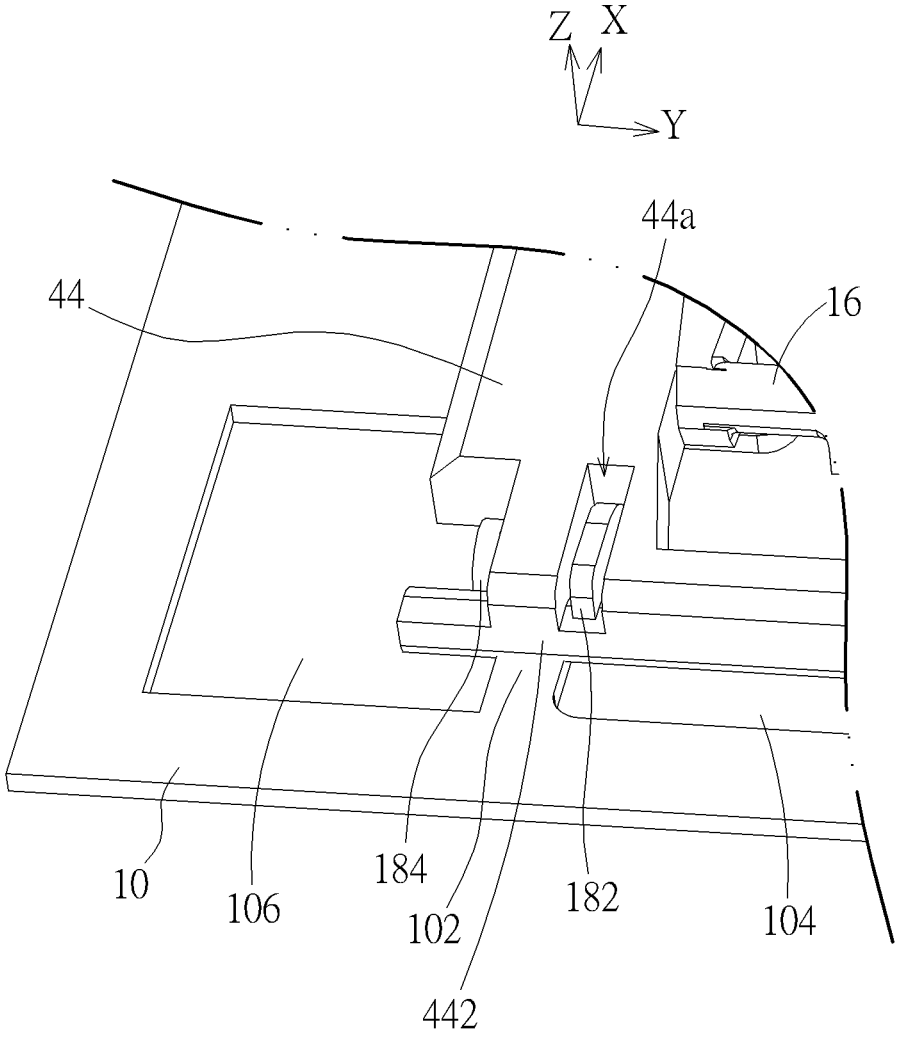
FIG. 9 is an enlarged view of a portion of the keyswitch structure in FIG. 8 with respect to a first connection structure thereof.

Furthermore, please refer to FIG. 8 and FIG. 9. FIG. 8 is a schematic diagram illustrating a keyswitch structure 4 of another embodiment according to the invention; therein, the keyswitch structure 4 is partially exploded. FIG. 9 is an enlarged view of a portion of the keyswitch structure 4 in FIG. 8 with respect to the first connection structure 18; therein, for simplification of the figure, the membrane circuit board 22 is not shown in FIG. 9. The keyswitch structure 4 is structurally similar to the keyswitch structure 1, and therefore, the keyswitch structure 4 uses reference numbers used in the keyswitch structure 1 in principle. For other descriptions of the components of the keyswitch structure 4, please refer to the relevant descriptions of the components of the keyswitch structure 1 with the same component names, which will not be described in addition. A significant difference between the keyswitch structure 4 and the keyswitch structure 1 is that a first support 44 of the keyswitch structure 4 has an open slot 44a adjacent to a rod-shaped connection portion 442 of the first support 44. The first vertical-motion limiting part 182 is located in the open slot 44a; the first horizontal-motion limiting part 184 is located at an outer side of the first support 44. Similarly, the first connection structure 18 also can position the first support 44 in the second direction (or Y-axis direction) through the open slot 44a. Furthermore, in practice, if the first horizontal-motion limiting part 184 and the first vertical-motion limiting part 182 are interchanged, then the first horizontal-motion limiting part 184 is located in the open slot 44a, and the first vertical-motion limiting part 182 is located at the outer side of the first support 44. For this case, the first connection structure 18 still can position the first support 44 through the open slot 44a.

Figure 10:
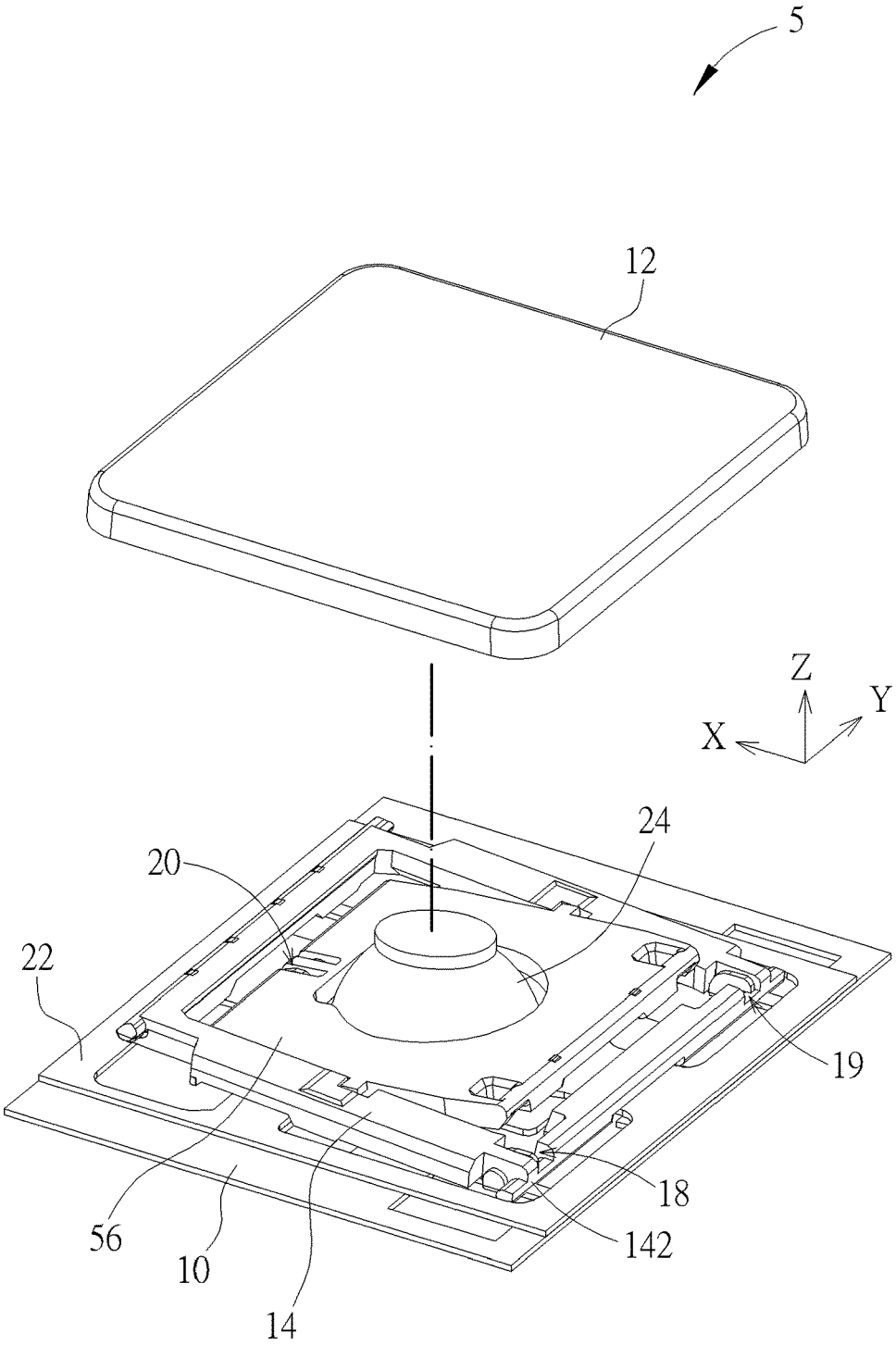
FIG. 10 is a schematic diagram illustrating a keyswitch structure of another embodiment; therein, the keyswitch structure is partially exploded.
Figure 11:
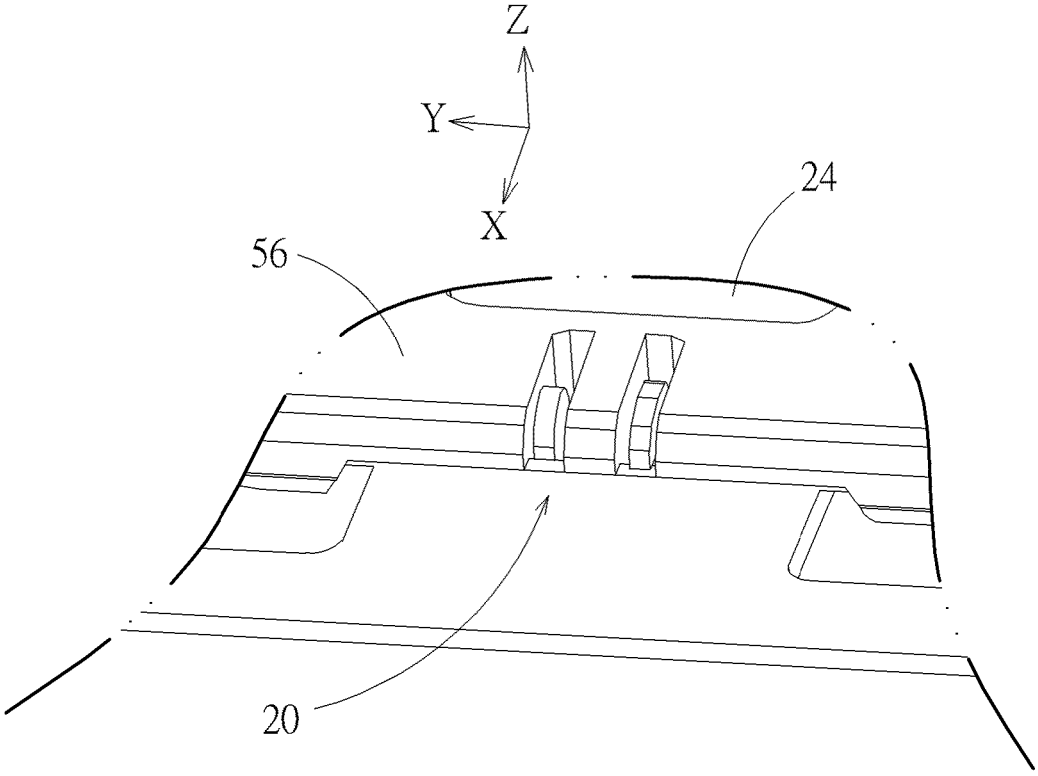
FIG. 11 is an enlarged view of a portion of the keyswitch structure in FIG. 10 with respect to a third connection structure thereof.

In the keyswitch structure 1, the first support 14 and the second support 16 are pivotally connected. The second support 16 is connected to the base 10 through the third connection structure 20 and the fourth connection structure 21. Therefore, the first support 14 and the second support 16 can be quite stably disposed on the base 10. However, the invention is not limited thereto. Please refer to FIG. 10 and FIG. 11. FIG. 10 is a schematic diagram illustrating a keyswitch structure 5 of another embodiment according to the invention; therein, the keyswitch structure 5 is partially exploded. FIG. 11 is an enlarged view of a portion of the keyswitch structure 5 in FIG. 10 with respect to the third connection structure 20; therein, for simplification of the figure, the membrane circuit board 22 and the first support 14 are not shown in FIG. 11. The keyswitch structure 5 is structurally similar to the keyswitch structure 1, and therefore, the keyswitch structure 5 uses reference numbers used in the keyswitch structure 1 in principle. For other descriptions of the components of the keyswitch structure 5, please refer to the relevant descriptions of the components of the keyswitch structure 1 with the same component names, which will not be described in addition. A significant difference between the keyswitch structure 5 and the keyswitch structure 1 is that a second support 56 of the keyswitch structure 5 is connected to the base 10 through the third connection structure 20; therein, a lower end of the second support 56 is movably connected to the third connection structure 20 through an engaging space of the third connection structure 20 (which can be understood more with referring to the relevant descriptions and figures for the movably connecting of the rod-shaped connection portion 142 with first engaging space 1824). Because the first connection structure 18 and the second connection structure 19 are located at two sides of the first support 14, and the third connection structure 20 is located between the first connection structure 18 and the second connection structure 19, the three connection structures 18-20 are disposed in an isosceles triangle so that the first support 14 and the second support 16 as a whole is connected to the base 10 through the three connection structures 18-20. Therefore, the first support 14 and the second support 16 of the keyswitch structure 5 also can be quite stably disposed on the base 10.

Figure 12:
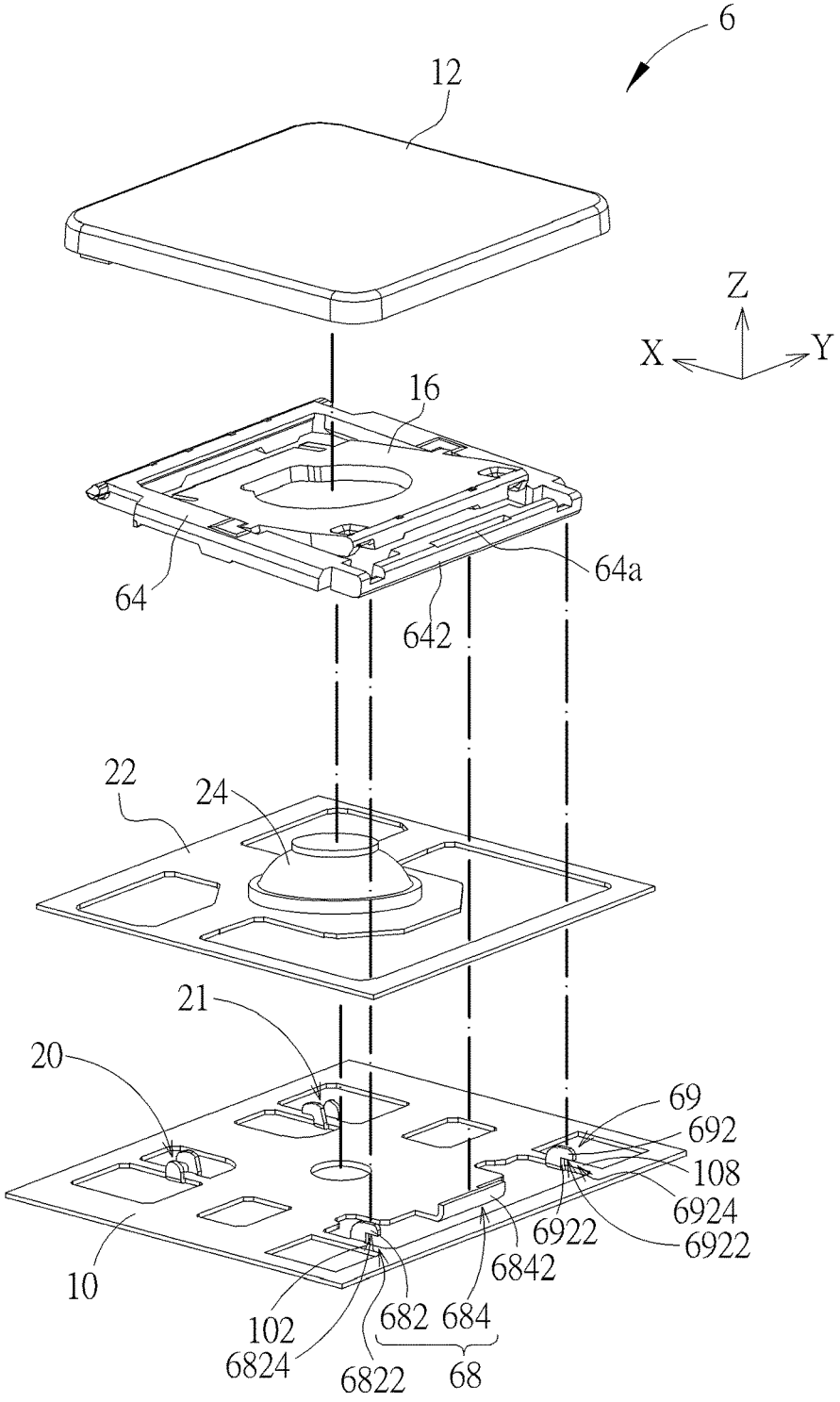
FIG. 12 is an exploded view of a keyswitch structure of another embodiment.
Figure 13:
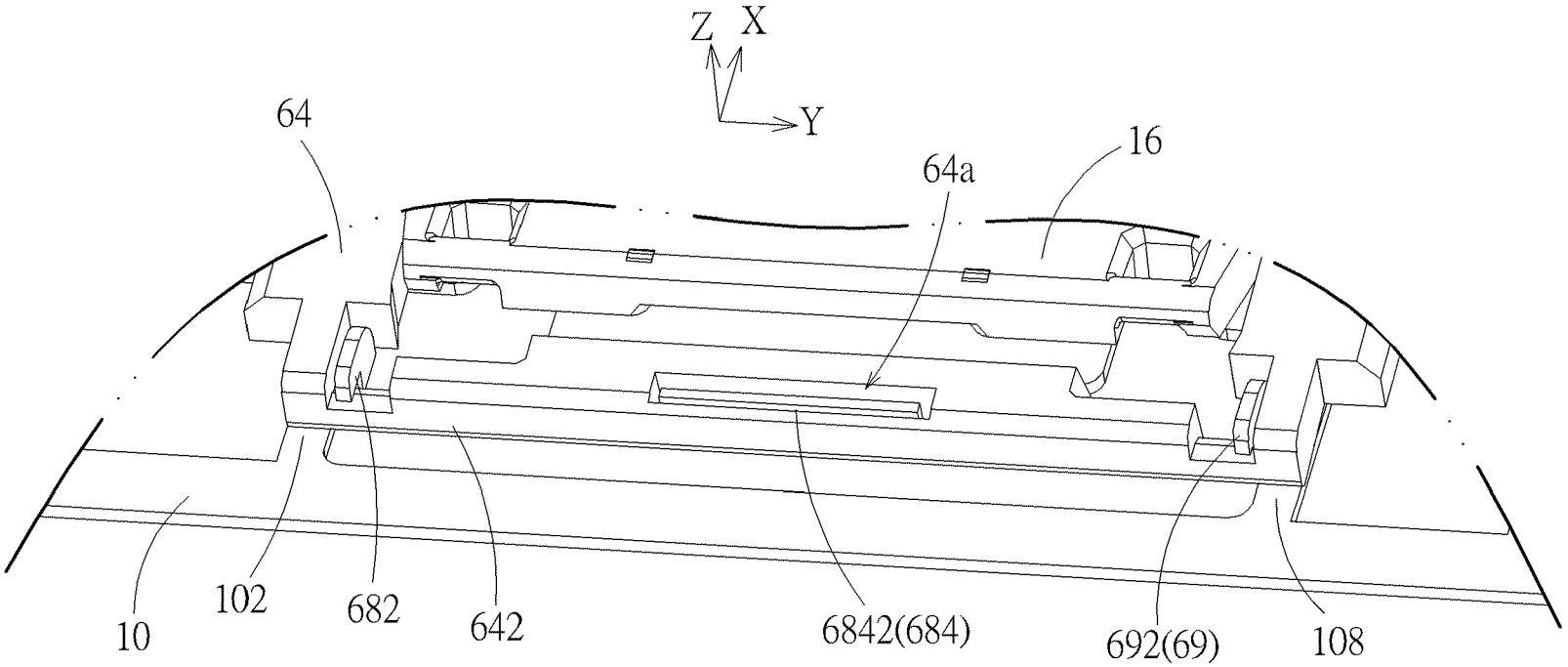
FIG. 13 is an enlarged view of a portion of the keyswitch structure in FIG. 12 with respect to a first connection structure thereof.

In the keyswitch structure 1, the first connection structure 18 and the second connection structure 19 are symmetrically disposed on the base 10 relative to the first direction; however, the invention is not limited thereto. Please refer to FIG. 12 and FIG. 13. FIG. 12 is an exploded view of a keyswitch structure 6 of another embodiment according to the invention. FIG. 13 is an enlarged view of a portion of the keyswitch structure 6 in FIG. 12 with respect to a first connection structure 68; therein, for simplification of the figure, the membrane circuit board 22 is not shown in FIG. 13. The keyswitch structure 6 is structurally similar to the keyswitch structure 1, and therefore, the keyswitch structure 5 uses reference numbers used in the keyswitch structure 1 in principle. For other descriptions of the components of the keyswitch structure 6, please refer to the relevant descriptions of the components of the keyswitch structure 1 with the same component names, which will not be described in addition. A significant difference between the keyswitch structure 6 and the keyswitch structure 1 is that a second connection structure 69 of the keyswitch structure 6 includes only a second vertical-motion limiting part 692, and a first horizontal-motion limiting part 684 of the first connection structure 68 is disposed away from a first vertical-motion limiting part 682 of the first connection structure 68. Therein, the first vertical-motion limiting part 682, the first horizontal-motion limiting part 684, and the second vertical-motion limiting part 692 are connected to the base 10. The first horizontal-motion limiting part 684 is located between the first vertical-motion limiting part 682 and the second vertical-motion limiting part 692. A second constraining surface 6922 of the second vertical-motion limiting part 692 extends along the first direction. The second constraining surface 6922 and a second abutting surface 108 of the base 10 form a second engaging space 6924. A first constraining surface 6822 of the first vertical-motion limiting part 682 and the first abutting surface 102 of the base 10 are disposed opposite and from a first engaging space 6824 therebetween. The first engaging space 6824 and the second engaging space 6924 are located at two sides of a first support 64 of the keyswitch structure 6. A first limiting surface 6842 of the first horizontal-motion limiting part 684 is located between the first engaging space 6824 and the second engaging space 6924. A rod-shaped connection portion 642 of the first support 64 is movably disposed in the first engaging space 6824 and the second engaging space 6924 simultaneously. A projection of the first limiting surface 6842 of the first horizontal-motion limiting part 684 in the second direction is located within a projection of the first engaging space 6824 in the second direction and also within a projection of the second engaging space 6924 in the second direction (which can be understood more with referring to the side view of the first connection structure 18 shown by FIG. 5). Therefore, only the first limiting surface 6842 can block the horizontal movement of the rod-shaped connection portion 642. Furthermore, in the embodiment, the first support 64 can optionally include a recess 64a adjacent to the rod-shaped connection portion 642. The first horizontal-motion limiting part 684 is located in the recess 64a. When the keycap 12 moves along the Z-axis direction toward the base 10, the first horizontal-motion limiting part 684 will not abut the recess 64a. When the keycap 12 moves along the Z-axis direction relative to the base 10 to the higher position, the first horizontal-motion limiting part 684 abuts a side wall of the recess 64a.

Figure 14:
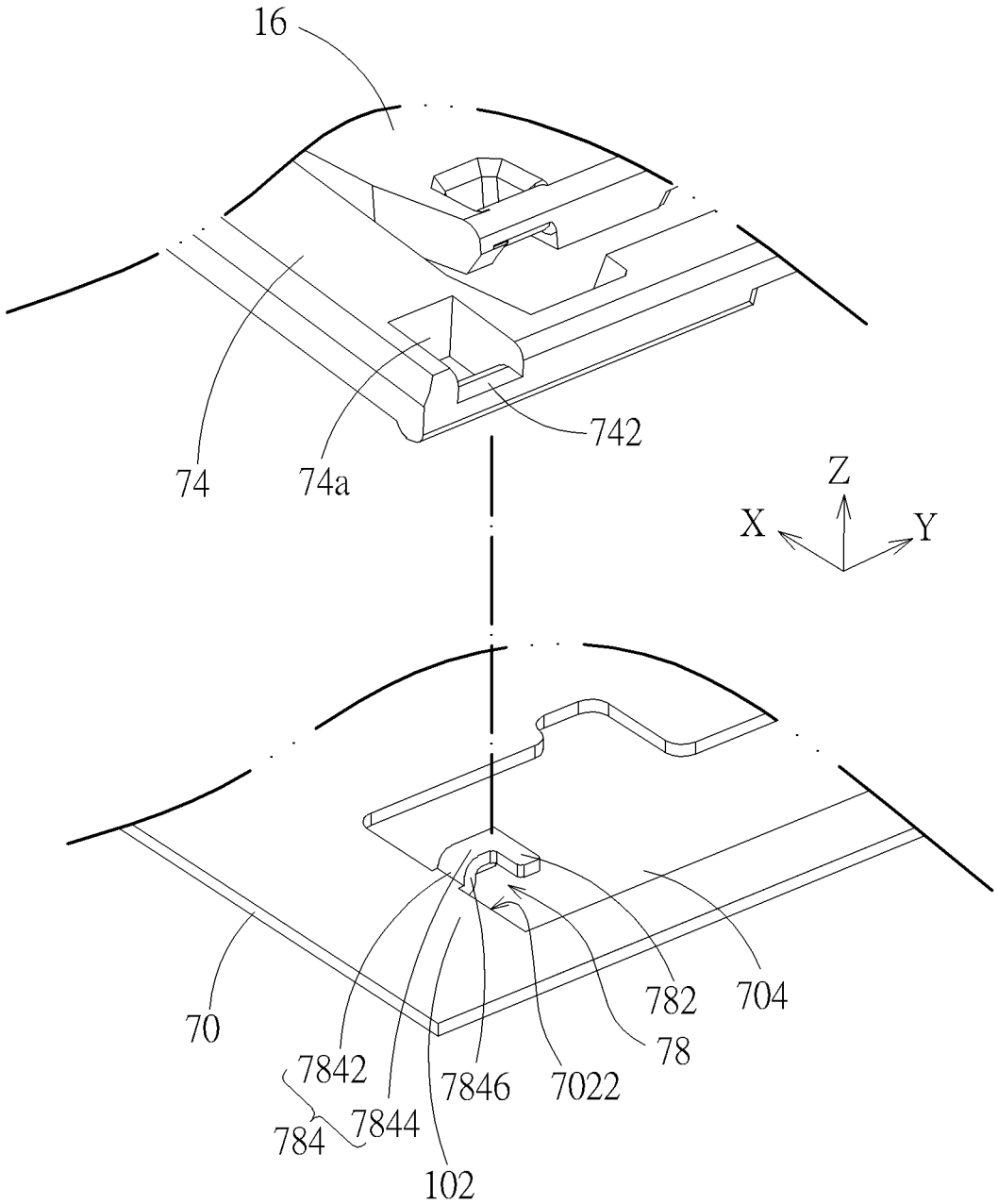
FIG. 14 is a schematic diagram illustrating disassembly of a first support and a first connection structure of a keyswitch structure of another embodiment.
Figure 15:
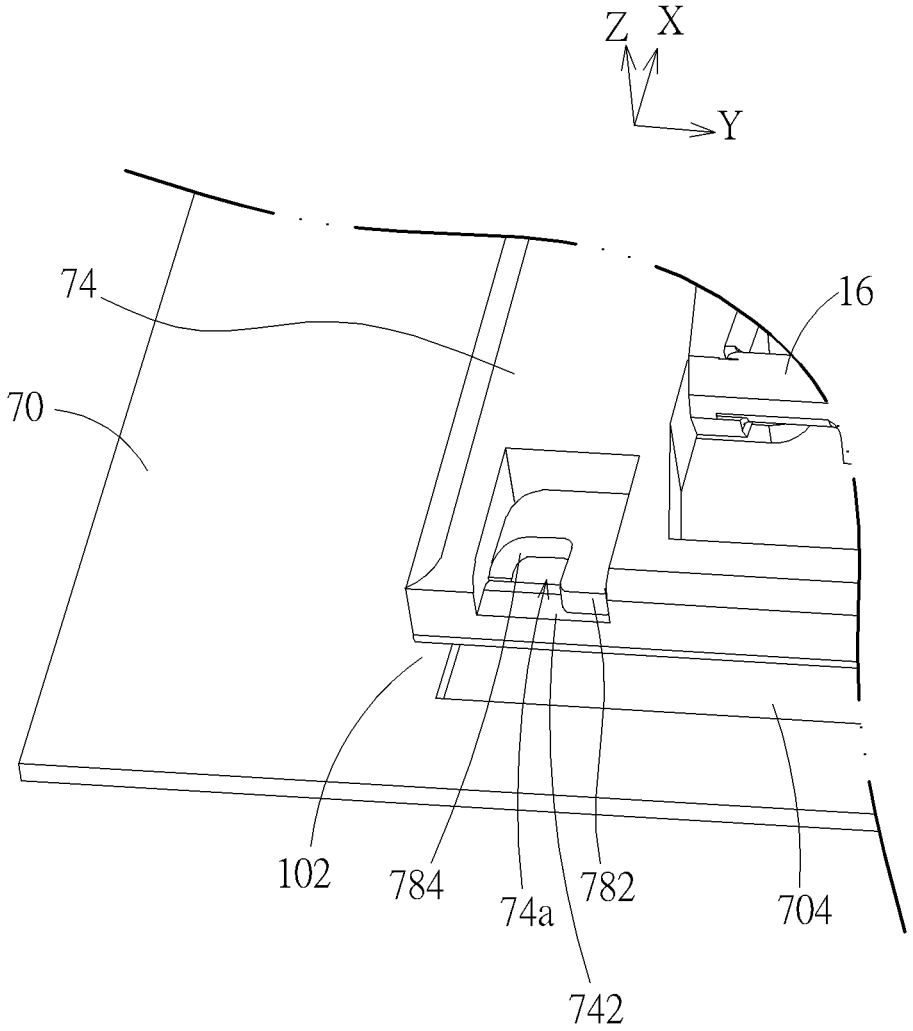
FIG. 15 is an enlarged view of a portion of the keyswitch structure in FIG. 14 with respect to the first connection structure.

In the above embodiments, the vertical-motion limiting parts 182, 682 and 692 and the horizontal-motion limiting parts 184 and 684 are independently disposed on the base 10; however, the invention is not limited thereto. Please refer to FIG. 14 and FIG. 15. FIG. 14 is a schematic diagram illustrating disassembly of a first support 74 and a first connection structure 78 of a keyswitch structure of another embodiment according to the invention. FIG. 15 is an enlarged view of a portion of the keyswitch structure in FIG. 14 with respect to the first connection structure 78; therein, for simplification of the figure, the membrane circuit board 22 is not shown in FIG. 15. The keyswitch structure of the embodiment is structurally similar to the keyswitch structure 1, and therefore, the keyswitch structure of the embodiment uses reference numbers used in the keyswitch structure 1 in principle. For other descriptions of the components of the keyswitch structure of the embodiment, please refer to the relevant descriptions of the components of the keyswitch structure 1 with the same component names, which will not be described in addition. A significant difference between the keyswitch structure of the embodiment and the keyswitch structure 1 is that the first connection structure 78 of the keyswitch structure of the embodiment is different to the first connection structure 18 of the keyswitch structure 1; correspondingly, a base 70 of the keyswitch structure of the embodiment and the first support 74 are partially different to the base 10 and the first support 14 of the keyswitch structure 1 respectively. In the embodiment, a first vertical-motion limiting part 782 and a first horizontal-motion limiting part 784 of the first connection structure 78 are directly connected to each other and are integrated with the base 70 to be a single part. The base 70 includes a through hole 704. The first abutting surface 102 of the base 70 is a top surface of a strip structure extending at a side of the through hole 704. The strip structure has a third side edge 7022. The first horizontal-motion limiting part 784 has a bottom portion 7842 and a top portion 7844. The bottom portion 7842 of the first horizontal-motion limiting part 784 extends substantially vertically upwards from the third side edge 7022 to [forma] *form a* first limiting surface 7846. The top portion 7844 of the first horizontal-motion limiting part 784 bends and extends substantially along a horizontal direction to connect with the first vertical-motion limiting part 782. In practice, the base 70 can be a metal base plate. The first vertical-motion limiting part 782 and the first horizontal-motion limiting part 784 are a single structure formed by a single portion of the metal base plate which extends from the third side edge 7022 (e.g. by a stamping process). Furthermore, the first support 74 has a through hole 74a. When a rod-shaped connection portion 742 of the first support 74 is assembled to the first connection structure 78, the first connection structure 78 is located in the through hole 74a, so the first connection structure 78 can position the first support 74 in the second direction through the through hole 74a. In addition, the connection of the first support 74 and the first connection structure 78 in the embodiment also can be applied to the connections of the first support 14 and the second support 16 with the second to the fourth connection structures 19-21. The practice therefor can be carried out easily according to the above embodiments, which will not be described in addition.

Figure 16:
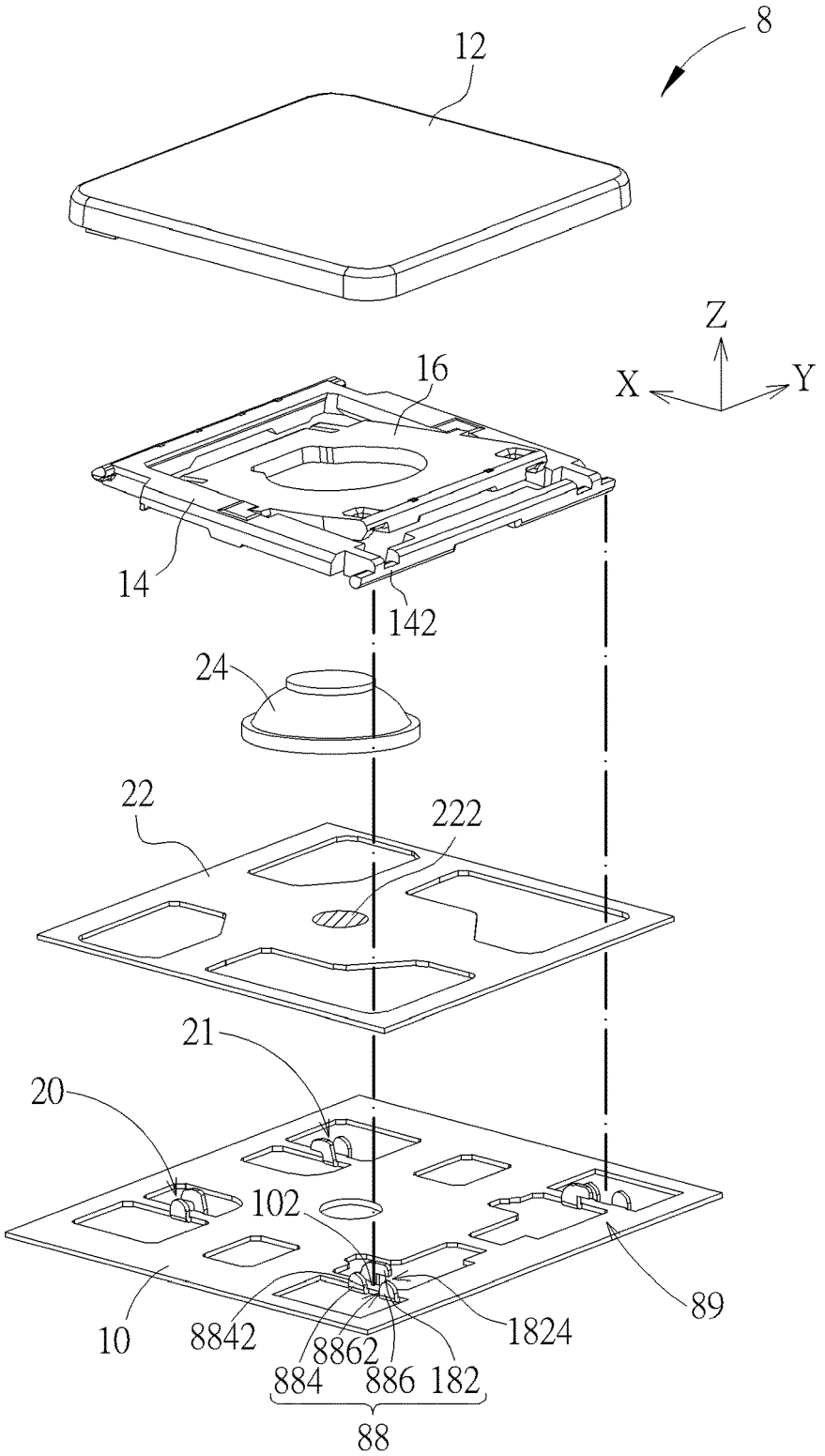
FIG. 16 is an exploded view of a keyswitch structure of another embodiment.
Figure 17:
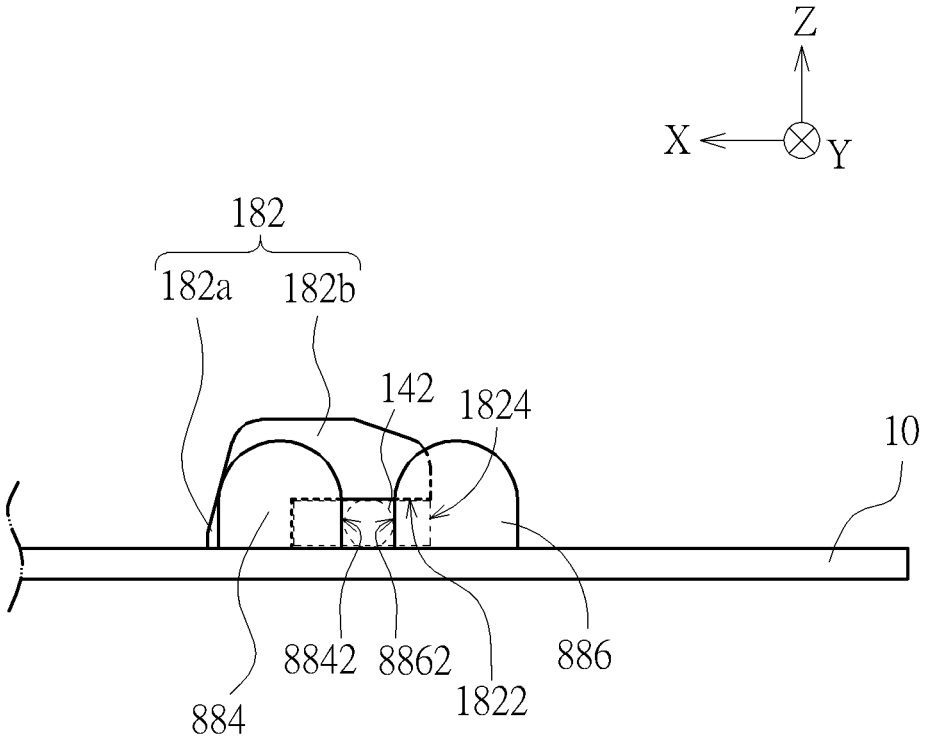
FIG. 17 is a side view of a base of the keyswitch structure in FIG. 16.
Figure 18:
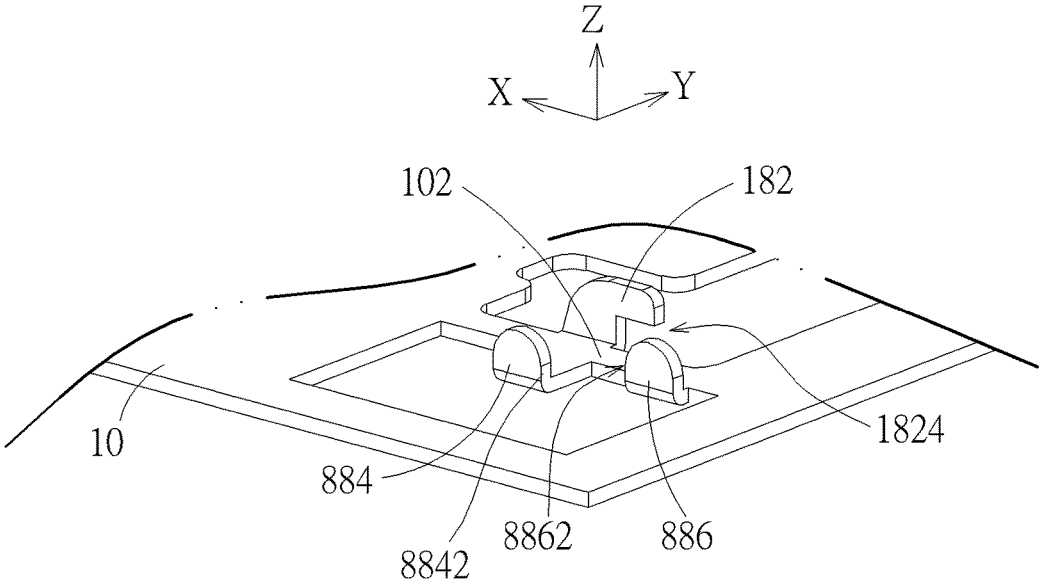
FIG. 18 is a schematic diagram illustrating a configuration of the first connection structure of the keyswitch structure in FIG. 16 according to another embodiment.

In the above embodiments, the rod-shaped connection portions 142, 342, 442, 642 and 742 are horizontally movable relative to the bases 10 and 70; however, the invention is not limited thereto. Please refer to FIG. 16, which is an exploded view of a keyswitch structure 8 of another embodiment according to the invention. The keyswitch structure 8 is structurally similar to the keyswitch structure 1, and therefore, the keyswitch structure 8 uses reference numbers used in the keyswitch structure 1 in principle. For other descriptions of the components of the keyswitch structure 8, please refer to the relevant descriptions of the components of the keyswitch structure 1 with the same component names, which will not be described in addition. A significant difference between the keyswitch structure 8 and the keyswitch structure 1 is that a first connection structure 88 of the keyswitch structure 8 includes a first horizontal-motion limiting part 884 and a second horizontal-motion limiting part 886 which are disposed on the base 10. A first limiting surface 8842 of the first horizontal-motion limiting part 884 and a second limiting surface 8862 of the second horizontal-motion limiting part 886 are separated in the first direction. The first limiting surface 8842 and the second limiting surface 8862 are located at two opposite sides of the rod-shaped connection portion 142 respectively to limit movement of the rod-shaped connection portion 142 in the first direction (or the X-axis direction) and in a direction reverse to the first direction (or a direction reverse to the X-axis direction) together. In another aspect, projections of the limiting surfaces 8842 and 8862 in the second direction are within a projection of the engaging space 1824 in the second direction, as shown by FIG. 17. A second connection structure 89 of the keyswitch structure 8 is structurally symmetrical to the first connection structure 88 in the first direction, so the above relevant descriptions of the first connection structure 88 is also applicable to the second connection structure 89, which will not be described in addition. In practice, the first limiting surface 8842 and the second limiting surface 8862 can be designed to abut the rod-shaped connection portion 142 together. Thereby, after the rod-shaped connection portion 142 is assembled to the first connection structure 88 and the second connection structure 89, the rod-shaped connection portion 142 can only rotate, so that the first support 14 and the base 10 are configured to be pivotally connected to each other. Furthermore, in the embodiment, the horizontal-motion limiting parts 884 and 886 are substantially coplanarly disposed; however, the invention is not limited thereto. For example, the horizontal-motion limiting parts 884 and 886 are separated in the first direction (i.e. non-coplanarly disposed, as shown by FIG. 18), of which a side view is substantially the same as the side view of the first connection structure 88 (as shown by FIG. 17). Therefore, the configuration of the horizontal-motion limiting parts 884 and 886 also can perform the horizontal limitation of the first connection structure 88 to the rod-shaped connection portion 142.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A keyswitch structure, comprising:

a base having a first abutting surface;

a keycap disposed above the base;

a first support connected to and between the base and the keycap, the first support comprising a rod-shaped connection portion;

a second support connected to and between the base and the keycap, the keycap being supported by the first support and the second support and moving up and down relative to the base through the first support and the second support; and a first connection structure disposed on the base, the first connection structure comprising:

a first vertical-motion limiting part having a first constraining surface, the first constraining surface extending substantially along a first direction, the first direction is substantially parallel to the first abutting surface, the first constraining surface and the first abutting surface defining a first engaging space therebetween, the rod-shaped connection portion being [movably] disposed in the first engaging space, the rod-shaped connection portion [being movable substantially parallel to the first direction or] being rotatable around a second direction, the second direction being perpendicular to the first direction and substantially parallel to the first abutting surface; and a first horizontal-motion limiting part having a first limiting surface, the first limiting surface being substantially perpendicular to the first direction, the first limiting surface and the first constraining surface being separated[in the second direction], the first limiting surface facing the rod-shaped connection portion, the first limiting surface limiting movement of the rod-shaped connection portion in the first direction by blocking the rod-shaped connection portion in the first engaging space[;

wherein a projection of the first limiting surface in the second direction is located within a projection of the first engaging space in the second direction].

2. The keyswitch structure of claim 1, wherein the first support has a through hole adjacent to the rod-shaped connection portion, and the first connection structure is located in the through hole.

3. The keyswitch structure of claim 1, wherein the first support comprises a support plate connected to the rod-shaped connection portion, and the first vertical-motion limiting part and the first horizontal-motion limiting part are located at two opposite sides of the support plate.

4. The keyswitch structure of claim 1, wherein the base further comprises two through holes, the first abutting surface is a top surface of a strip structure extending between the two through holes, the strip structure has a first side edge and a second side edge, the first vertical-motion limiting part is disposed at the first side edge, and the first horizontal-motion limiting part is disposed at the second side edge.

5. The keyswitch structure of claim 4, wherein the base is a metal base plate, the first vertical-motion limiting part is formed by a portion of the metal base plate, which protrudes from the first side edge and bends and extends upward, and the first horizontal-motion limiting part is formed by a portion of the metal base plate, which protrudes from the second side edge and bends and extends upward.

6. The keyswitch structure of claim 4, wherein the first support has an open slot adjacent to the rod-shaped connection portion, one of the first vertical-motion limiting part and the first horizontal-motion limiting part is located in the open slot, and the other of the first vertical-motion limiting part and the first horizontal-motion limiting part is located at an outer side of the first support.

7. The keyswitch structure of claim 1, wherein the base further comprises a through hole, the first abutting surface is a top surface of a strip structure extending at a side of the through hole, the strip structure has a third side edge, the first horizontal-motion limiting part has a bottom portion and a top portion, the bottom portion of the first horizontal-motion limiting part extends substantially vertically upwards from the third side edge to form the first limiting surface, the top portion of the first horizontal-motion limiting part bends and extends substantially along the second direction so that the top portion is separated from the bottom portion along the second direction, and the first vertical-motion limiting part is connected to an end of the top portion.

8. The keyswitch structure of claim 7, wherein the base is a metal base plate, the first vertical-motion limiting part and the first horizontal-motion limiting part area single structure formed by a single portion of the metal base plate which extends from the third side edge.

9. The keyswitch structure of claim 1, further comprising a second connection structure disposed on the base, wherein the second connection structure comprises a second vertical-motion limiting part, the second vertical-motion limiting part has a second constraining surface, the second constraining surface extends substantially along the first direction, the second constraining surface and a second abutting surface of the base define a second engaging space therebetween, the first engaging space and the second engaging space are located at two sides of the first support, the first limiting surface is located between the first engaging space and the second engaging space, *and* the rod-shaped connection portion is [movably] *rotatably* disposed in *both* the first engaging space and the second engaging space [simultaneously, and a projection of the first limiting surface in the second direction is located within a projection of the second engaging space in the second direction].

10. The keyswitch structure of claim 9, wherein the first support has a recess adjacent to the rod-shaped connection portion, and the first horizontal-motion limiting part is located in the recess.

11. The keyswitch structure of claim 1, further comprising a second connection structure and a third connection structure, wherein the first support is connected to the base through the first connection structure and the second connection structure, the first connection structure and the second connection structure are located at two sides of the first support, the second support is connected to the base through the third connection structure, and the third connection structure is located between the first connection structure and the second connection structure.

12. The keyswitch structure of claim 11, wherein the third connection structure further comprises a third horizontal-motion limiting part and a third vertical-motion limiting part, the third horizontal-motion limiting part has a third limiting surface, the third vertical-motion limiting part is connected to the base and has a third constraining surface, the third constraining surface extends substantially along a direction reverse to the first direction, the third constraining surface and a third abutting surface of the base define a third engaging space therebetween, *and* a lower end of the second support is movably connected to the third connection structure through the third engaging space[, and a projection of the third limiting surface in the second direction is located within a projection of the third engaging space in the second direction].

13. The keyswitch structure of claim 1, wherein a structural end of the first vertical-motion limiting part in a direction reverse to the first direction is protrusive relative to a structural end of the first horizontal-motion limiting part in the direction reverse to the first direction.

14. The keyswitch structure of claim 1, wherein the first connection structure further comprises a second horizontal-motion limiting part connected to the base and having a second limiting surface, the second limiting surface is substantially perpendicular to the first direction, the first limiting surface and the second limiting surface are separated in the first direction, the first limiting surface and the second limiting surface are located at two opposite sides of the rod-shaped connection portion and limit movement of the rod-shaped connection portion in the first direction and in a direction reverse to the first direction together.

15. A keyswitch structure, comprising:

a base having a first abutting surface substantially parallel to an X-axis direction;

a keycap disposed above the base;

a first support connected to and between the base and the keycap, a lower end of the first support having a rod-shaped connection portion, the rod-shaped connection portion having a first portion side surface and a second portion side surface, the first portion side surface and the second portion side surface being separated by a distance in a Y-axis direction;

a second support movably connected to and between the base and the keycap, the keycap being supported by the first support and the second support and moving between a higher position and a lower position along a Z-axis direction through the first support and the second support, the X-axis direction, the Y-axis direction, and the Z-axis direction being non-parallel to each other; and a first connection structure disposed on the base, the first connection structure comprising:

a first vertical-motion limiting part having a first constraining surface, the first constraining surface extending substantially along the X-axis direction, the first constraining surface and the first abutting surface defining a first engaging space therebetween, the rod-shaped connection portion being [movably] *rotatably* disposed in the first engaging space; and a first horizontal-motion limiting part having a first limiting surface, the first limiting surface being substantially perpendicular to the X-axis direction, the first limiting surface facing the rod-shaped connection portion, the first limiting surface setting a movement end of the rod-shaped connection portion along the X-axis direction by blocking the rod-shaped connection portion;

wherein the first limiting surface and the first constraining surface are separated by the distance in the Y-axis direction; *and*

*wherein the first connection structure and the first support are arranged such that* when the keycap moves relative to the base along the Z-axis direction, the first constraining surface abuts the second portion side surface without contacting the first portion side surface[;], *and* when the keycap moves away from the base to the higher position, the first limiting surface abuts the first portion side surface without contacting the second portion side surface.

16. The keyswitch structure of claim 15, wherein a structural end of the first vertical-motion limiting part in a direction reverse to the X-axis direction is protrusive relative to a structural end of the first horizontal-motion limiting part in the direction reverse to the X-axis direction.

17. The keyswitch structure of claim 15, wherein the base further comprises two through holes, the first abutting surface is a top surface of a strip structure extending between the two through holes, the strip structure has a first side edge and a second side edge, the first vertical-motion limiting part is disposed at the first side edge, and the first horizontal-motion limiting part is disposed at the second side edge.

18. The keyswitch structure of claim 17, wherein the base is a metal base plate, the first vertical-motion limiting part is formed by a portion of the metal base plate, which protrudes from the first side edge and bends and extends upward, and the first horizontal-motion limiting part is formed by a portion of the metal base plate, which protrudes from the second side edge and bends and extends upward.

19. The keyswitch structure of claim 17, wherein the first support has an open slot adjacent to the rod-shaped connection portion, one of the first vertical-motion limiting part and the first horizontal-motion limiting part is located in the open slot, and the other of the first vertical-motion limiting part and the first horizontal-motion limiting part is located at an outer side of the first support.

20. The keyswitch structure of claim 15, wherein the base further comprises a through hole, the first abutting surface is a top surface of a strip structure extending at a side of the through hole, the strip structure has a third side edge, the first horizontal-motion limiting part has a bottom portion and a top portion, the bottom portion of the first horizontal-motion limiting part extends substantially vertically upwards from the third side edge to form the first limiting surface, the top portion of the first horizontal-motion limiting part bends and extends substantially along the second direction so that the top portion is separated from the bottom portion along the second direction, and the first vertical-motion limiting part is connected to an end of the top portion.

21. The keyswitch structure of claim 20, wherein the base is a metal base plate, the first vertical-motion limiting part and the first horizontal-motion limiting part are a single structure formed by a single portion of the metal base plate which extends from the third side edge.

22. The keyswitch structure of claim 15, wherein the first connection structure further comprises a second horizontal-motion limiting part connected to the base and having a second limiting surface, the second limiting surface is substantially perpendicular to the X-axis direction, the first limiting surface and the second limiting surface are separated in the X-axis direction, the first limiting surface and the second limiting surface are located at two opposite sides of the rod-shaped connection portion and limit movement of the rod-shaped connection portion in the X-axis direction and in a direction reverse to the X-axis direction together.

*23. A keyswitch structure, comprising:*

*a base;*

*a keycap disposed above the base;*

*a first support connected to and between the base and the keycap, the first support comprising a rod-shaped connection portion;*

*a second support connected to and between the base and the keycap, the keycap movable between a higher position and a lower position relative to the base by movement of the first support and the second support;*

*a vertical-motion limiting part, disposed on the base and engaged with the rod-shaped connection portion; and*

*a horizontal-motion limiting part, disposed on the base and having a first limiting surface arranged to limit movement of the rod-shaped connection portion in a first direction;*

*wherein the first limiting surface abuts a first portion of the rod-shaped connection portion when the keycap is in the higher position, and the horizontal-motion limiting part and the vertical-motion limiting part are both disposed on the base on a first side of the rod-shaped connection portion.*

*24. The keyswitch structure of claim 23, wherein the vertical-motion limiting part comprises an L-shaped structure having a vertical connection portion and a horizontal extension portion, arranged such that a bottom surface of the horizontal extension portion constrains vertical motion of a second portion the rod-shaped connection portion.*

*25. The keyswitch structure of claim 23, wherein the base comprises a first through hole, a second through hole, and a strip structure separating the first and second through holes, wherein the strip structure has a first side edge adjacent to the first through hole and a second side edge adjacent to the second through hole, the vertical-motion limiting part is disposed on at the first side edge, and the horizontal-motion limiting part is disposed on at the second side edge.*

*26. The keyswitch structure of claim 25, wherein the first support comprises a first support plate connected with the rod-shaped connection portion and extending between the vertical-motion limiting part and the horizontal-motion limiting part.*

*27. The keyswitch structure of claim 23, further comprising a second horizontal-motion limiting part disposed on the base on a second side of the rod-shaped connection portion opposite to the first side, the second horizontal-motion limiting part comprising a second limiting surface facing the first limiting surface, wherein the first and second limiting surfaces are arranged to limit movement of the rod-shaped connection portion in the first direction and in a second direction opposite to the first direction.*

* * * * *